(12) United States Patent
Lin

(10) Patent No.: US 9,952,487 B2
(45) Date of Patent: Apr. 24, 2018

(54) PROJECTOR

(71) Applicant: Qisda Corporation, Taoyuan County (TW)

(72) Inventor: Chi-Cheng Lin, Taoyuan County (TW)

(73) Assignee: Qisda Corporation, Taoyuan (TW)

(*) Notice: Subject to any disclaimer, the term of this patent is extended or adjusted under 35 U.S.C. 154(b) by 0 days.

(21) Appl. No.: 15/144,897

(22) Filed: May 3, 2016

(65) Prior Publication Data

US 2016/0330419 A1 Nov. 10, 2016

(30) Foreign Application Priority Data

May 5, 2015 (TW) .............................. 104114322 A

(51) Int. Cl.
*G03B 21/16* (2006.01)
*H04N 9/31* (2006.01)
*G03B 21/14* (2006.01)

(52) U.S. Cl.
CPC ........... *G03B 21/16* (2013.01); *G03B 21/145* (2013.01); *H04N 9/3144* (2013.01)

(58) Field of Classification Search
CPC .............................. G03B 21/16; H04N 9/3144
See application file for complete search history.

(56) References Cited

U.S. PATENT DOCUMENTS

| 6,497,489 | B1 | 12/2002 | Li et al. | |
|---|---|---|---|---|
| 6,935,753 | B2* | 8/2005 | Takezawa | G02B 7/008 |
| | | | | 348/E9.027 |
| 8,246,171 | B2* | 8/2012 | Chen | G03B 21/16 |
| | | | | 165/151 |
| 8,418,978 | B2* | 4/2013 | Young | F16M 13/02 |
| | | | | 220/475 |
| 8,944,638 | B2* | 2/2015 | Miyazaki | F21V 29/004 |
| | | | | 362/294 |
| 9,028,076 | B2* | 5/2015 | Nishima | G03B 21/16 |
| | | | | 353/119 |
| 2002/0048001 | A1* | 4/2002 | Fujimori | G03B 21/22 |
| | | | | 353/119 |
| 2003/0202160 | A1* | 10/2003 | Chimura | G03B 21/16 |
| | | | | 353/52 |

(Continued)

FOREIGN PATENT DOCUMENTS

| CN | 101576704 A | 11/2009 |
|---|---|---|
| CN | 101644878 A | 2/2010 |

(Continued)

OTHER PUBLICATIONS

Office action of counterpart application by Taiwan IP Office dated Oct. 20, 2016.

(Continued)

*Primary Examiner* — Bao-Luan Le

(57) ABSTRACT

A projector includes a casing having a top plate and a bottom plate, an optical engine disposed in the casing and between the top and bottom plates, and a plurality of heat sinks disposed around the optical engine. The top plate and the bottom plate have a plurality of top holes and bottom holes, respectively. Each heat sink has a plurality of fins and a plurality of air channels formed between the fins, wherein the top holes are aligned and communicate with the bottom holes through the air channels straightly.

13 Claims, 8 Drawing Sheets

(56) References Cited

U.S. PATENT DOCUMENTS

| | | | |
|---|---|---|---|
| 2004/0032569 A1* | 2/2004 | Takezawa | G02B 7/008 353/31 |
| 2005/0190562 A1* | 9/2005 | Keuper | H04N 9/3111 362/325 |
| 2007/0001766 A1 | 1/2007 | Ripley et al. | |
| 2007/0287331 A1* | 12/2007 | Young | G03B 21/145 439/607.01 |
| 2008/0158876 A1* | 7/2008 | Thrailkill | F21K 9/00 362/235 |
| 2008/0232100 A1* | 9/2008 | Lin | G03B 21/20 362/231 |
| 2011/0019161 A1* | 1/2011 | Chen | G03B 21/16 353/61 |
| 2011/0157560 A1 | 6/2011 | Hsiao | |
| 2012/0069586 A1* | 3/2012 | Miyazaki | F21V 29/004 362/382 |
| 2012/0106173 A1* | 5/2012 | Yoneda | F21V 29/004 362/373 |
| 2013/0010268 A1* | 1/2013 | Nishima | G03B 21/16 353/52 |
| 2013/0050664 A1* | 2/2013 | Morohoshi | G03B 21/145 353/119 |
| 2014/0085612 A1* | 3/2014 | Wu | G03B 21/16 353/57 |
| 2015/0009218 A1* | 1/2015 | Fukutomi | G03B 21/145 345/428 |

FOREIGN PATENT DOCUMENTS

| | | |
|---|---|---|
| CN | 101848627 A | 9/2010 |
| CN | 201903749 U | 7/2011 |
| CN | 104582438 A | 4/2015 |
| TW | M480099 | 6/2014 |

OTHER PUBLICATIONS

Office action of counterpart application by SIPO dated Aug. 25, 2017.

* cited by examiner

PROJECTOR

BACKGROUND OF THE INVENTION

1. Field of the Invention

The invention is related to a projector. Particularly, the invention is related to a projector having a heat dissipation mechanism of high efficient natural convection.

2. Description of the Prior Art

The power of the projector is designed bigger and bigger to comply with the brightness requirements. However, the efficiency of light-emitting diodes is not correspondingly increased. Even in the case of lower power, existing products require cooling fans for forced heat dissipation, and in the case of increased power, the problem caused by thermal effect becomes worse.

In the conventional design of projector, the fan is often used for heat dissipation, so the heat dissipation mechanism is mostly based on forced convection to allow air flows generated by the fan to flow smoothly for better heat dissipation effect. However, since the fan in operation will generate relatively loud noise, if the rotation speed of the fan can be greatly reduced or even the use of the fan can be eliminated, it will be a significant improvement for home video or environment need to be quiet.

Moreover, when the operating power of the light emitting diode becomes larger and larger, the heat generated by the light emitting diode will accordingly increase. For a compact projector, the R/G/B light sources are usually disposed on three sides of the light mixer, and thus the overall heat dissipation effect for compact projector is affected by the space limitation.

Therefore, how to effectively utilize internal space, arrange internal elements, reduce the fan speed, or even eliminate the use of the fan to make the projector still operate normally under an effective heat dissipation is a big issue for in designing the projector.

SUMMARY OF THE INVENTION

It is an object of the invention to provide a projector having a heat dissipation mechanism of high efficient natural convection to greatly reduce the rotation speed of the fan or even to eliminate the use of the fan and thus reduce the noise generated by the fan in operation.

It is another object of the invention to provide a projector having optimum arrangement of the circuit boards to reduce the influence of thermal effect and thus promote the performance of the projector.

It is yet another object of the invention to provide a projector using the metal conductor incorporated with heat sinks to promote the heat dissipation effect.

In an embodiment, the invention provides a projector including a casing having a top plate and a bottom plate, the top plate having a plurality of top holes, the bottom plate having a plurality of bottom holes, an optical engine disposed in the casing and between the top plate and the bottom plate, and a plurality of heat sinks disposed around the optical engine, each heat sink having a plurality of fins and a plurality of air channels formed between the fins, wherein the top holes are aligned and communicate with the bottom holes through the air channels straightly.

In an embodiment, the optical engine includes a light source module, an image-forming module, and a light pipe connected between the light source module and the image-forming module. The plurality of heat sinks include a first heat sink, a second heat sink, and a third heat sink respectively disposed on three sides of the light source module, so that the plurality of fins are arranged parallel to each other along the three sides.

In an embodiment, the light source module includes a plurality of light-emitting units attached to the plurality of heat sinks, respectively.

In an embodiment, the projector further includes a main circuit board and a power supply circuit board, wherein the light source module is disposed on one side of the image-forming module; the main circuit board is disposed under the light source module; the power supply circuit board is disposed on another side of the image-forming module.

In an embodiment, the projector further includes an auxiliary heat sink, wherein the auxiliary heat sink is disposed on top of the image-forming module; the auxiliary heat sink has a plurality of fins parallel to each other and extending toward the top plate to form a plurality of auxiliary air channels between the fins.

In an embodiment, the projector further includes at least one extending heat sink, wherein the extending heat sink extends from one side of the auxiliary heat sink toward the bottom plate to be located on the side of the image-forming module; the extending heat sink has a plurality of fins disposed parallel to each other and along the side of the image-forming module to form a plurality of extending air channels between the fins, and at least one of the top holes is aligned and communicates with at least one of the bottom holes through the extending air channels straightly.

In an embodiment, with respect to the bottom plate, the power supply circuit board is disposed upright, and the main circuit board is disposed horizontally.

In an embodiment, the projector further includes a driving circuit board, wherein the driving circuit board is disposed between the light source module and the main circuit board.

In an embodiment, the projector further includes a metal conductor, wherein the metal conductor includes a body and an extension part; the body is located between the driving circuit board and the main circuit board to substantially isolate the driving circuit board and the main circuit board, and the extension part bends from the body and extends to overlap at least one of the first heat sink, the second heat sink, and the third heat sink.

In an embodiment, the projector further includes a thermal conductive material, wherein the thermal conductive material fills at least one of between the driving circuit board and the metal conductor and between the main circuit board and the metal conductor.

In an embodiment, the projector further includes a plurality of thermal insulators disposed on an external surface of the top plate.

In an embodiment, the external surface of the top plate has a plurality of grooves, and the plurality of thermal insulators are partially inserted into the plurality of grooves.

In an embodiment, the projector further includes a plurality of circuit boards, wherein the plurality of circuit boards are disposed upright with respect to the bottom plate, so that at least one of top holes is aligned and communicates with at least one of the bottom holes through space adjacent to the plurality of circuit boards straightly.

In another embodiment, the invention provides a projector including a casing having a top plate and a bottom plate; and at least two circuit boards disposed in the casing and parallel to the top plate and the bottom plate, the at least two circuit boards having different temperature or power or having electronic units of different thermal sensitivity, wherein the at least two circuit boards stacks on each other according to the temperature or power or the thermal sensitivity of the electronic units; the circuit board closer to the bottom plate has a lower temperature or power, or the circuit board closer to the bottom plate has the electronic unit of higher thermal sensitivity.

In an embodiment, the at least two circuit boards includes a first circuit board having a first electronic unit and a second circuit board having a second electronic unit; the first electronic unit is less thermal sensitive than the second electronic unit, and the second circuit board stacks on top of the first circuit board.

In an embodiment, the projector further includes a metal conductor, wherein the metal conductor includes a body and an extension part; the body is located between the first circuit board and the second circuit board to substantially isolate the first circuit board and the second circuit board; the extension part bends from the body and extends to one side of the first circuit board, and the first electronic unit and the second electronic unit face two opposite surfaces of the body, respectively.

In an embodiment, the projector further includes a thermal conductive material, wherein the thermal conductive material fills at least one of between the first circuit board and the body and between the second circuit board and the body.

In another embodiment, the invention provides a projector including a casing; an optical engine disposed in the casing, the optical engine including a light source module and an image-forming module; and a heat sink disposed on top of the image-forming module, the heat sink having a plurality of fins parallel to each other and extending away from the top of the image-forming module to form a plurality of air channels between the fins.

In an embodiment, the projector further includes an extending heat sink, wherein the extending heat sink extends from one side of the heat sink toward bottom of the image-forming module to be located on a side of the image-forming module; the extending heat sink has a plurality of fins disposed parallel to each other and along the side of the image-forming module to form a plurality of extending air channels between the fins, and the extending air channels correspondingly communicate with the air channels.

In an embodiment, the image-forming module includes a digital micromirror device disposed on a top side of the image-forming module and attached to the heat sink.

In an embodiment, the image-forming module includes a lens module, and the extending heat sink extends to one side of the leans module.

In another embodiment, the invention provides a projector including a casing; an optical engine disposed in the casing, the optical engine including a light source module and an image-forming module disposed on one side of the light source module; a first circuit board horizontally disposed under the light source module; and a second circuit board disposed upright on another side of the image-forming module and away from the light source module.

In an embodiment, the projector further includes a heat sink disposed on top of the image-forming module, wherein the heat sink has a plurality of fins disposed parallel to each other and extending away from the top of the image-forming module to form a plurality of air channels between the fins.

In an embodiment, the projector further includes an extending heat sink extending from one side of the heat sink and toward bottom of the image-forming module to be parallel to the second circuit board, wherein the extending heat sink has a plurality of fins disposed parallel to each other and along the image-forming module to form a plurality of extending air channels between the fins, and the extending air channels correspondingly communicate with the pair channels.

In an embodiment, the temperature or power of the first circuit board is lower than that of the second circuit board.

In another embodiment, the invention provides a projector including a casing having a top plate and a bottom plate, the top plate having a plurality of top holes, the bottom plate having a plurality of bottom holes; an optical engine disposed in the casing and between the top plate and the bottom plate; and a plurality of circuit boards disposed on one side of the optical engine, wherein the circuit boards are disposed upright with respect to the bottom plate, so that at least one of the top holes is aligned and communicates with a least one of the bottom holes through space adjacent to the circuit boards straightly.

In an embodiment, the optical engine includes an image-forming module and a light source module disposed on one side of the image-forming module; the plurality of circuit boards are disposed on another side of the image-forming module.

In an embodiment, the plurality of circuit boards include a power supply circuit board disposed furthest away from the image-forming module among the circuit boards.

DETAILED DESCRIPTION OF THE PREFERRED EMBODIMENT

The invention provides a projector, particularly a projector having heat dissipation mechanism of natural convection, to reduce the rotation speed of the fan or even to eliminate the use of the fan, so that the noise generated by the fan can be reduced and the operation quality can be promoted. Moreover, the projector of the invention has an optimum arrangement of the circuit boards to reduce the influence of thermal effect. The projector of the invention also utilizes the metal conductor incorporated with the heat sinks to promote the heat dissipation effect. Hereinafter, embodiments of the projector of the invention will be described in detail with reference to the drawings.

Figure 1A:
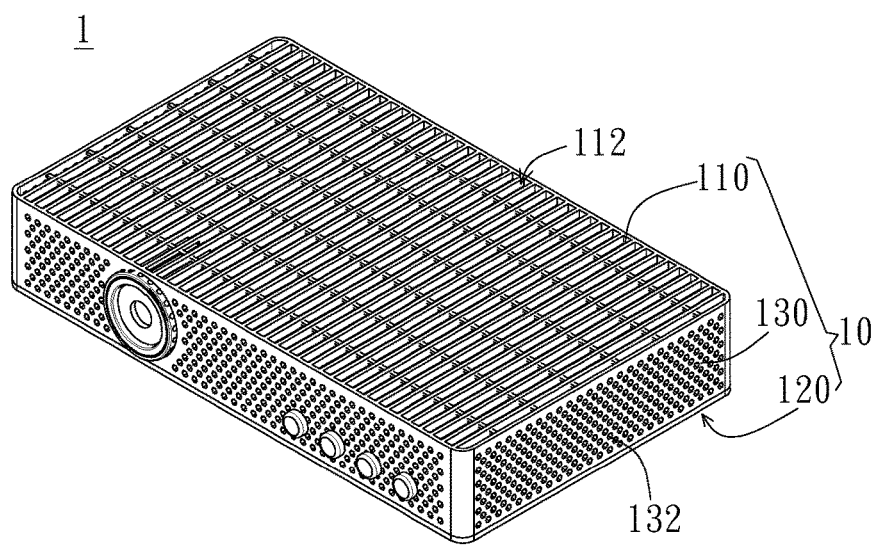
FIG. 1A is a perspective view of the projector according to an embodiment of the invention.
Figure 1B:
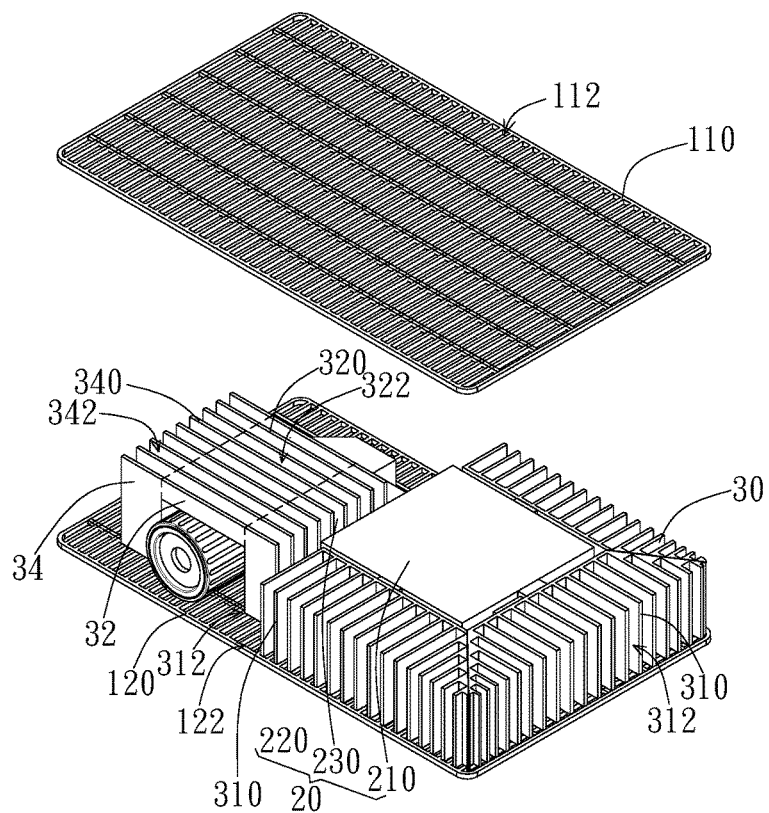
FIG. 1B is an exploded view of the projector of FIG. 1A without lateral plates.
Figure 1C:
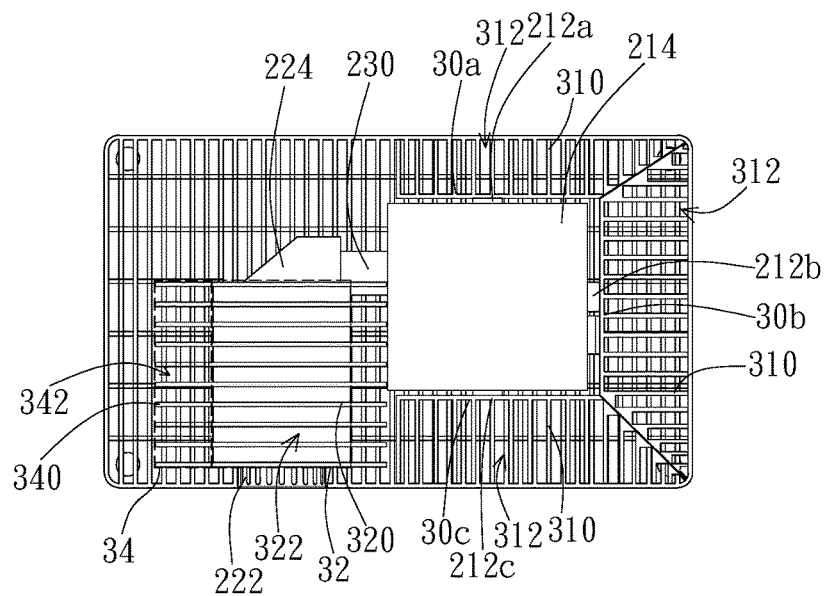
FIG. 1C is a top view of the projector of FIG. 1A without the top plate.

As shown in FIG. 1A to FIG. 1C, in an embodiment, the projector 1 of the invention includes a casing 10, an optical engine 20, and a plurality of heat sinks 30. The casing 10 has a top plate 110 and a bottom plate 120 disposed in parallel. The casing 10 also has a plurality of side plate 130 surrounding the top plate 110 and the bottom plate 120 and connected between the top plate 110 and the bottom plate 120 to enclose an accommodation space for accommodating the components of the projector 1 including the optical engine 20 and the heat sinks 130. In this embodiment, the top plate 110 has a plurality of top holes 112, and the bottom plate 120 has a plurality of bottom holes 122, wherein the top holes 112 and the bottom holes 122 serve as the inlets and outlets for air flow. Moreover, as shown in FIG. 1A, the side plate 130 preferably has a plurality of side holes 132 to facilitate the heat dissipation effect. In this embodiment, the casing 10 is preferably made of metal, such as aluminum, but not limited thereto. In other embodiments, the casing 10 can be made of alloy or non-metal (e.g. polymer materials).

Figure 2A:
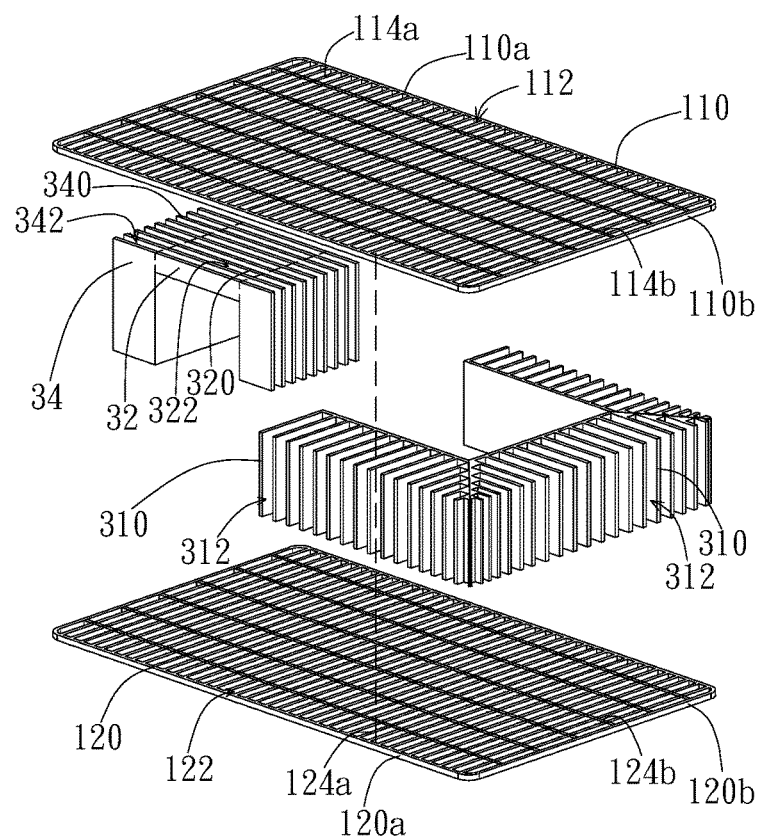
FIG. 2A is a schematic view of the arrangement of the top plate, the bottom plate, and the heat sinks of the projector of FIG. 1A.

In this embodiment, as shown in FIG. 1B and FIG. 2A, the top plate 110 is preferably a grid plate having a plurality of intersected ribs 114a, 114b to form the top holes 112. For example, the plurality of ribs 114a are disposed in parallel along a first side 110a of the top plate 110, and the plurality of ribs 114b are disposed in parallel along a second side 110b of the top plate 110 that is adjacent to the first side 110a, so that the ribs 114a and the ribs 114b are intersected to form a plurality of grids as the top holes 112. It is noted that the interval, the number, the width of the ribs 114a can be the same as or different from those of the ribs 114b, and the ribs 114a and the ribs 114b can be intersected in a different manner to form the top holes of different shape. In this embodiment, the extension direction of the ribs 114a is preferably perpendicular to the first side 110a, and the extension direction of the ribs 114b is preferably perpendicular to the second side 110b, so that the top holes 12 will be a plurality of rectangular holes arranged in matrix, but not limited thereto. In another embodiment (not shown), the ribs 114a and 114b can be disposed in an inclined manner, so that the extension directions of the ribs 114a and 114b will have an included angle that is not a right angle with respect to the first side 110a and the second side 110b, respectively. As such, the plurality of top holes 112 will have a diamond shape and arranged in matrix. The bottom plate 120 can also be a grid plate having a plurality of intersected ribs 124a, 124b to form the bottom holes 122, wherein the ribs 124a, 124b can be arranged in parallel along the first side 120a and the second side 120b in a manner similar to the ribs 114a, 114b of the top plate 110, and will not elaborate hereinafter.

It is noted that the top plate 110 and the bottom plate 120 are disposed in a manner that the top holes 112 are at least partially aligned with the bottom holes 122, so that the top holes 112 can be aligned and communicate with the bottom holes 122 through the air channels 312 straightly, as shown in FIG. 1B and FIG. 2A (will be described later). That is, the shape, size, or number of the top holes 112 can be the same as or different from those of the bottom holes 122, and not limited to the embodiment. For example, in other embodiments, the top holes 112 and the bottom holes 122 can be the openings formed in the top plate 110 and the bottom plate 120, respectively, and the opening can have a circular shape, a rectangular shape, or any suitable geometric shape or irregular shape.

Figure 2B:
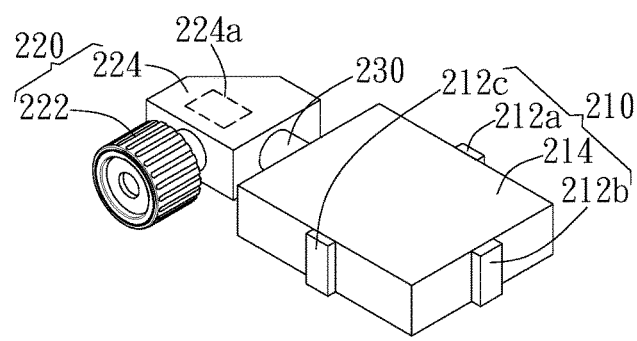
FIG. 2B is a schematic view of the optical engine of the projector of FIG. 1A.

As shown in FIGS. 1B, 1C, and 2B, the optical engine 20 is disposed in the casing 10 and between the top plate 110 and the bottom plate 120. Particularly, the optical engine 20 includes a light source module 210, an image-forming module 220, and a light pipe 230. The image-forming module 220 is disposed on the side of the light source module 210, and the light pipe 230 is connected between the light source module 210 and the image-forming module 220. In this embodiment, the light pipe 230 can be a light tube, light rod, or other suitable optical unit for transmitting light. The light source module 210, the image-forming module 220, and the light pipe 230 are arranged in an "L" shape, but not limited thereto. In other embodiments, the light source module 210, the image-forming module 220, and the light pipe 230 can be arranged in a straight line or any suitable shape according to design needs. The light source module 210 transmits light to the image-forming module 220 through the light pipe 230, and the image-forming module 220 processes the light according to the image data and projects the light out of the casing 10 to form images.

Particularly, the light source module 210 includes a plurality of light-emitting units 212a, 212b, 212c and a light-mixing unit 214. The light-emitting units 212a, 212b, 212c are disposed around the light-mixing unit 214 and emit light toward the light-mixing unit 214. In this embodiment, one side of the light-mixing unit 214 is connected to the light pipe 230, and the light-emitting units 212a, 212b, 212c are respectively disposed on different sides of the light-mixing unit 214, such as the other three sides, and emit light of different colors or wavelengths toward the light-mixing unit 214. The light-mixing unit 214 receives and mixes lights emitted from the light-emitting units 212a, 212b, 212c and then outputs the mixed light (e.g. white light) toward the light pipe 230. In this embodiment, the light-emitting units 212a, 212b, 212c are preferably light-emitting diodes that emit red light, green light, and blue light, respectively, but not limited thereto. In other embodiments, the light-emitting units 212a, 212b, 212c can be light-emitting diodes that emit white light or emit light of other colors or wavelengths. The image-forming module 220 includes a lens unit 222 and an image-forming unit 224. The image-forming unit 224 is connected to the light pipe 230 to receive light and processes the light according to the image data to obtain a corresponding target light. Then, the lens unit 222 projects the target light out of the casing 10 to form images. In an embodiment, the image-forming unit 224 includes a digital micromirror device (DMD) 224a, which controls micromirrors to reflect light according to the image signal for forming the image.

As shown in FIGS. 1B and 1C, a plurality of heat sinks 30 are disposed around the optical engine 20, wherein each of the heat sinks 30 has a plurality of fins 310 and a plurality of air channels 312 formed between the fins 310. As described above, the plurality of heat sinks 30 are so disposed that the top holes 112 are aligned and communicate with the corresponding bottom holes 122 through the air channels 312 straightly. As shown in FIG. 1C, the plurality of heat sinks 30 include a first heat sink 30a, a second heat sink 30b, and a third heat sink 30c respectively disposed on three sides of the light source module 210. That is, the first heat sink 30a, the second heat sink 30b, and the third heat sink 30c are disposed corresponding to the light-emitting units 212a, 212b, 212c on the three sides of the light-mixing unit 214, respectively, so that the plurality of fins 310 are arranged parallel to each other along the three sides of the light-mixing unit 214 and extend away from the light-mixing unit 214. As such, the air channels 312 are disposed along the three sides of the light-mixing unit 214, and each air channel 312 is aligned and communicates with the corresponding top hole 112 and bottom hole 122. From another aspect, the plurality of fins 310 stand upright between the top plate 110 and the bottom plate 120, and viewing from the top holes 112 of the top plate 110 toward the bottom plate 120, the bottom plate 120 can be seen through via the corresponding air channel 312 and bottom hole 122. That is, the top hole 112 of the top plate 110, the corresponding air channel 312 and bottom hole 122 constitute a straight air path that vertically penetrates through the casing 10. Therefore, the projector 1 can achieve very efficient heat dissipation by natural convection.

As shown in FIG. 1C, in an embodiment, the light-emitting units 212a, 212b, 212c are preferably attached to the heat sinks, such as the first heat sink 30a, the second heat sink 30b, and the third heat sink 30c, respectively. In other words, the substrates of the light-emitting units 212a, 212b, 212c are preferably attached to surfaces of the heat sinks that face away from the fins 310 to promote heat dissipation.

Figure 3A:
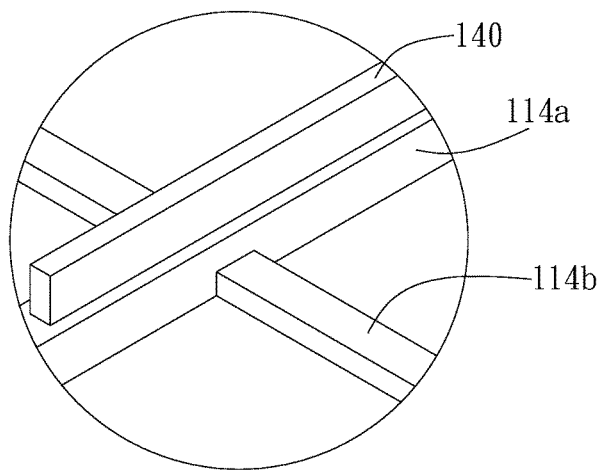
FIG. 3A is a schematic view of the top plate with the thermal insulator according to an embodiment of the invention.
Figure 3B:
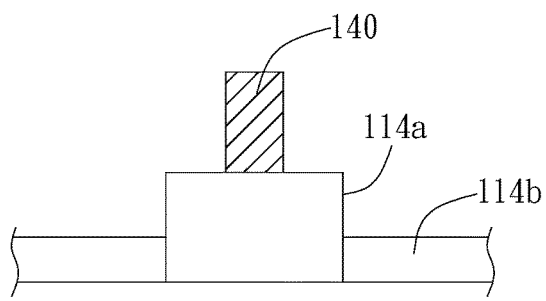
FIGS. 3B and 3C are cross-sectional views of the thermal insulator disposed on the top plate according to different embodiments of the invention.
Figure 3C:
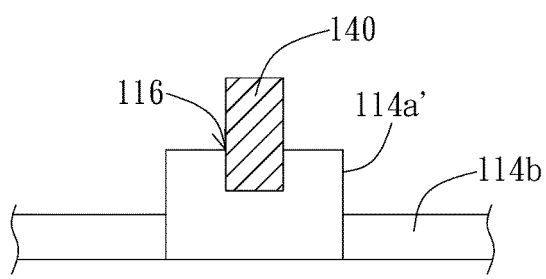

Moreover, as shown in FIG. 3A, a plurality of thermal insulators 140 can be disposed on an external surface of the top plate 110 to provide heat insulation for the user. Particularly, the thermal insulator 140 and the top plate 110 are formed by different materials, wherein the thermal insulator 140 has a better thermal insulation effect than the top plate 110. In this embodiment, the thermal insulator 140 is preferably made of flexible material, such as silicone, to provide a better touch feeling and insulation effect. In an embodiment, as shown in FIG. 3B, the thermal insulator 140 has a strap shape and is attached to the surface of the rib 114a. In another embodiment, as shown in FIG. 3C, the external surface of the top plate 110 has a plurality of grooves 116, and the plurality of thermal insulators 140 are partially inserted into the plurality of grooves 116. For example, the groove is formed on the surface of the rib 114a' and extends along the lengthwise direction of the rib 114a'. The bottom of the strap-like thermal insulator 140 is inserted into the groove 116, so that the thermal insulator 140 protrudes from the surface of the top plate 110 (i.e. the rib 114a'). When the projector 1 dissipates heat to the casing 10 through the heat sinks 30 and natural convection, the thermal insulators 140 can prevent users from directly touching the top plate 110 of higher temperature and also provide a better touch feeling.

In an embodiment, as shown in FIGS. 1B, 1C, and 2A, the projector 1 further includes an auxiliary heat sink 32, which has a plurality of fins 320. The auxiliary heat sink 32 is preferably disposed corresponding to the image-forming module 220, particularly corresponding to the digital micromirror device 224a of the image-forming module 220. In this embodiment, the auxiliary heat sink 32 is disposed on top of the image-forming module 220, e.g. on top of the image-forming unit 224, and further extends to the top of the lens unit 222. In this case, the digital micromirror device 224a is preferably disposed on the top portion of the image-forming module 220 and attached to the auxiliary heat sink 32. That is, the digital micromirror device 224a is preferably disposed on the top portion of the image-forming module 220 and the substrate of the digital micromirror device 224a is attached to the surface of the auxiliary heat sink 32 that faces away from the fins 320. In this embodiment, the plurality of fins 320 of the auxiliary heat sink 32 are disposed parallel to each other and extend toward the top plate 110 to form a plurality of auxiliary air channels 322 between the fins 320. It is noted that the top holes 112 of the top plate 110 and the side holes 132 of the side plate 130 are preferably disposed corresponding to the auxiliary heat sink 32, so that the top holes 112, the side holes 132, the auxiliary air channel 322 can constitute heat dissipation paths to promote the heat dissipation effect.

The projector 1 further includes at least one extending heat sink 34, wherein the extending heat sink 34 extends from one side of the auxiliary heat sink 32 toward the bottom plate 120 to be located on the side of the image-forming module 220. The extending heat sink 34 has a plurality of fins 340 disposed parallel to each other and along the side of the image-forming module 220 to form a plurality of extending air channels 342 between the fins 340. At least one of the top holes 112 is aligned and communicates with at least one of the bottom holes 122 through the extending air channels 342 straightly. That is, similarly, the top holes of the top plate 110 and the bottom holes 122 of the bottom plate 122 are preferably disposed corresponding to the extending heat sink 34, so that the top holes 112 can be aligned with and communicate with the bottom holes 122 through the corresponding extending air channels 342 straightly to constitute a flow path for natural convection. In this embodiment, two extending heat sinks 34 preferably extend from two sides of the auxiliary heat sink 32, so that the extending heat sinks 34 and the auxiliary heat sink 32 constitute an integral "n" shaped heat sink, but not limited thereto. The fins 340 of the extending heat sinks 34 on two sides of the "n" shaped heat sink preferably extend away from each other toward the side plate 130 and the light source module 210, respectively. In other embodiments, the extending heat sink 34 can extend downwardly from a single side, two sides, or more than two sides of the auxiliary heat sink 32 to form an integral "L" shaped or other shaped heat sink together with the auxiliary heat sink 32. It is noted that the extending heat sink 34 and the auxiliary heat sink 32 are preferably an integral heat sink or can be separate heat sinks. When the extending heat sink 34 and the auxiliary heat sink 32 are integrated into one piece, the fins 340 of the extending heats sink 34 and the fins 320 of the auxiliary heat sink 32 are preferably disposed in a manner that the extending air channels 342 respectively correspond to the auxiliary air channels 322, but not limited thereto. Moreover, when the extending heat sink 34 is disposed along one side of the auxiliary heat sink 32, the length of the extending heat sink 34 and the length of the side of the auxiliary heat sink 32 where the extending heat sink 34 is disposed can be the same or different. For example, when the auxiliary heat sink 32 is disposed merely on top of the image-forming unit 224, the extending heat sink 34 can be disposed merely on the side of the image-forming unit 224 or further extend to the side of the lens unit 222. Alternatively, when the auxiliary heat sink 32 is disposed on top of the image-forming unit 224 and extends to the top of the lens unit 222, the extending heat sink 34 can be disposed on the sides of the image-forming unit 224 and the lens unit 222 or merely on the side of the image-forming unit 224.

Figure 4A:
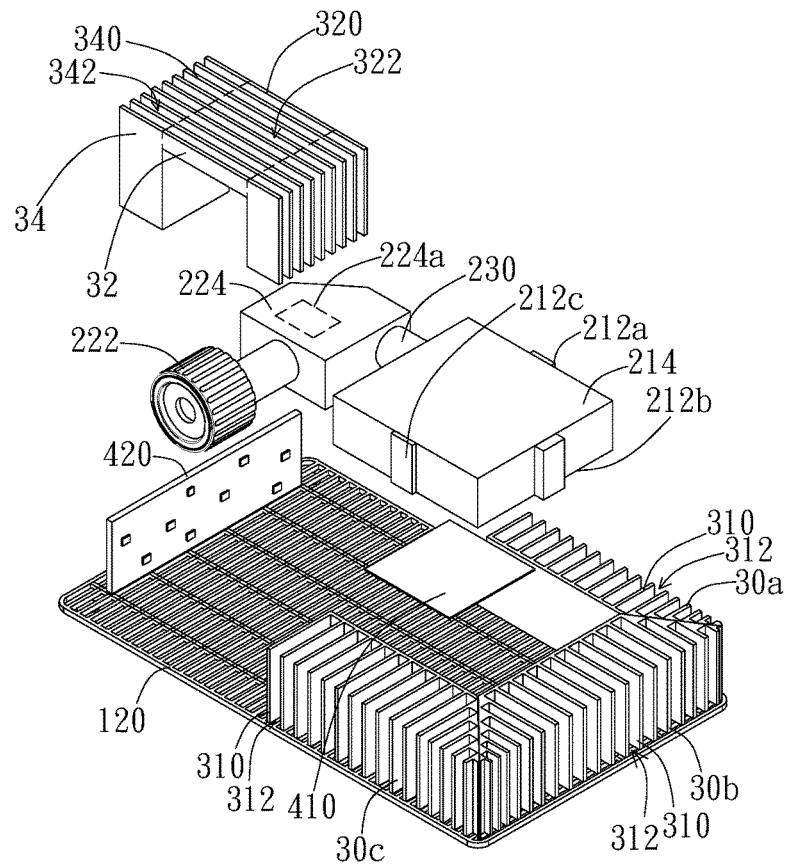
FIG. 4A and FIG. 4B are schematic views of the projector according to another embodiment of the invention, wherein the top plate and the lateral plates are not illustrated.
Figure 4B:
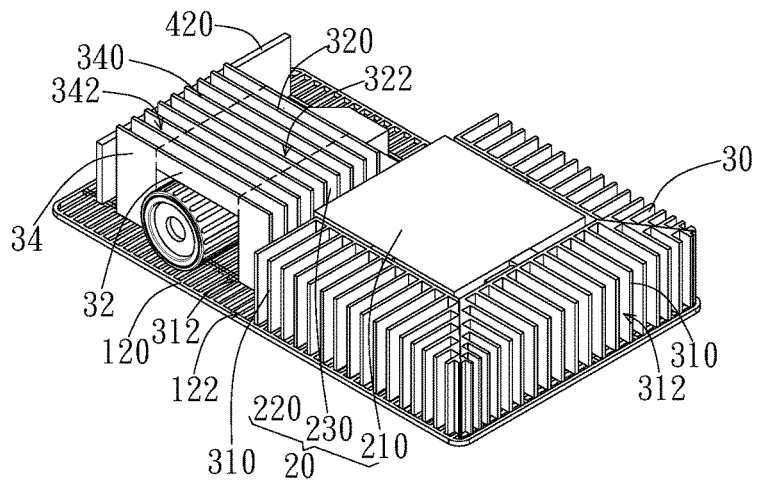

Moreover, the projector of the invention can minimize the influence of thermal effect by optimizing the arrangement of circuit boards. Particularly, the projector further includes a plurality of circuit boards (e.g. circuit boards 410, 420, 430), wherein each circuit board has a different temperature or power. The projector can optimize the arrangement of the circuit boards according to the temperature or power to reduce the influence of thermal effect. As shown in FIGS. 4A and 4B, in an embodiment, the projector further includes circuit boards 410, 420, wherein the circuit board 410 is disposed under the light source module 210, and the circuit board 420 is disposed on one side of the image-forming module 220 and away from the circuit board 410 and the light source module 210. For example, the circuit board 410 is a main circuit board, and the circuit board 420 is a power supply circuit board. The temperature or power of the power supply circuit board 420 is higher than that of the main circuit board 410. In this embodiment, with respect to the bottom plate 120, the main circuit board 410 is disposed horizontally under the light source module 210, and the power supply circuit board 420 is disposed upright on one side of the image-forming module 220. As such, the circuit boards 410, 420 of the projector 1 are arranged at separate places, i.e. the circuit board of high temperature or power (e.g. the power supply circuit board 420) is disposed alone, preventing the heat generated by the circuit boards 410, 420 from being gathered up at the same place, such as around the light source module 210, to worsen the thermal influence.

As shown in FIGS. 4A and 4B, in this embodiment, the extending heat sink 34 is preferably disposed between the circuit board 420 and the image-forming module 220 to isolate the circuit board 420 from the image-forming module 220. That is, the extending heat sink 34 extends from one side of the auxiliary heat sink 32 toward the bottom direction of the image-forming module 220 to be parallel to the circuit board 420 and located between the circuit board 420 and the image-forming module 220. In this embodiment, the fins 340 of the extending heat sink 34 extend toward the circuit board 420, and the electron units of the circuit board 420 that have higher temperature or power preferably face toward the side plate 130 while the electron units of the circuit board 420 that have lower temperature or power preferably face toward the fins 340. It is noted that the top holes 112 of the top plate 110 and the bottom holes 122 of the bottom plate 120 are preferably disposed corresponding to the extending heat sink 34, so that top holes 112 are aligned and communicate with the bottom holes 122 through the extending corresponding air channels 342 straightly to form flow paths for natural convention (referring to related descriptions of FIG. 1B).

Figure 5A:
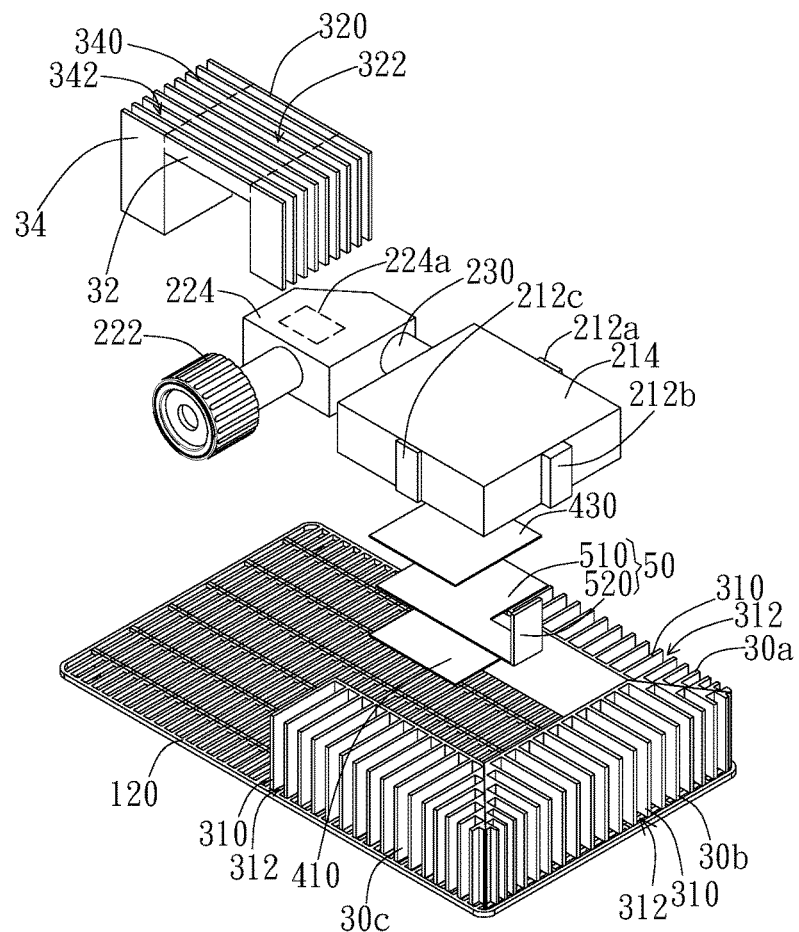
FIG. 5A and FIG. 5B are schematic views of the projector according to yet another embodiment, wherein the top plate and the lateral plates are not illustrated.
Figure 5B:
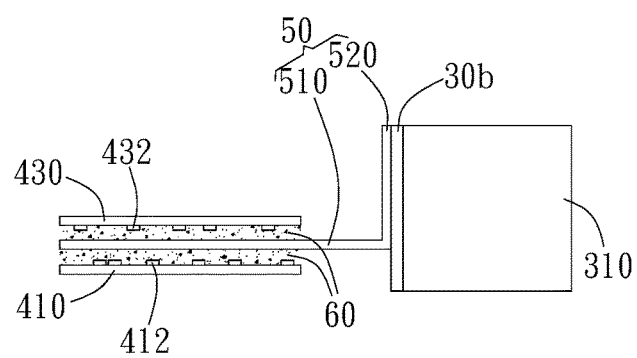

In another embodiment, the circuit boards of the projector are arranged at different levels according to the temperature or power of the circuit board or the thermal sensitivity of the electronic units of the circuit boards. Specifically, the circuit boards stack on each other according to the temperature or power or the thermal sensitivity of the electronic units, and the circuit board closer to the bottom plate has a lower temperature or power, or the circuit board closer to the bottom plate has the electronic unit much more susceptible to thermal influence. As shown in FIG. 5, the circuit boards 410, 430 are disposed under the light source module 210 and parallel to the bottom plate 120, wherein the temperature or power of the circuit board 410 is lower than that of the circuit board 430. For example, the circuit board 410 is the main circuit board which controls the operation of the projector, while the circuit board 430 is a driving circuit board for driving the light source. The main circuit board 410 is disposed under the light source module 210, and the driving circuit board 430 is disposed between the main circuit board 410 and the light source module 210. As shown in FIGS. 5A and 5B, the projector further includes a metal conductor 50. The metal conductor 50 includes a body 510 and an extension part 520. The body 510 is located between the driving circuit board 430 and the main circuit board 410 to substantially cover the surfaces of the circuit boards 410, 430 and to substantially isolate the driving circuit board 430 from the main circuit board 410. The extension part 520 bends from the body 510 and extends to the side of the circuit board 410 or 430. In an embodiment, the metal conductor 40 can be formed by bending an aluminum plate or sheet, so that the extension part 520 preferably flatly overlaps at least one of the heat sinks 30a, 30b, 30c to transfer the heat generated by the circuit boards to the heat sink (e.g. the second heat sink 30b).

Moreover, as shown in FIG. 5B, the circuit board 410 has the electronic unit 412 of lower thermal sensitivity, and the circuit board 430 has the electronic unit 432 of higher thermal sensitivity. As the metal conductor 50 is interposed between the circuit boards 410 and 430, the electronic units 412, 432 face two opposite surfaces of the body 510 of the metal conductor 50, respectively. It is noted that the electronic unit 412 of lower thermal sensitivity is an electronic component that is much more susceptible to thermal influence, and the electronic unit 432 of higher thermal sensitivity is an electronic component that is less susceptible to thermal influence. That is, when the plurality of circuit boards stack on each other, the circuit board having electronic units that are more susceptible to thermal influence is disposed closer to the bottom plate 120, and the circuit board having electronic units that are less susceptible to thermal influence is disposed closer to the top plate 110, so that the electronic units that are susceptible to thermal influence can be operated at normal temperature. The projector further includes a thermal conductive material 60, such as thermal conductive glue. The thermal conductive material 60 fills between the driving circuit board 430 and the metal conductor 50 and/or between the main circuit board 410 and the metal conductor 50 to enhance the heat transfer from the metal conductor 50 to the heat sink 30b. It is noted that the metal conductor 50 in FIG. 5 is merely illustrated with one extension part 520 to flatty attach to the heat sink 30b, but not limited thereto. In other embodiments, the metal conductor may have one or more than one bent extension parts to flatty attach to same or different heat sinks, such as heat sinks 30a, 30b, 30c. In addition, the bending direction of the extension part can be modified according to the design need and not limited to bending upward. In another embodiment, the extension part 520 can be formed by bending downward from the body 510. In the case of more than one extension part, the extension parts can be bent toward the same or different direction. Moreover, in this embodiment, the surface of the body 510 of the metal conductor 50 is a flat surface, and in other embodiments, the body 510 may have a concave-convex surface corresponding to the location or size of the electronic units on two sides. It is noted that two stacked circuit boards 410, 430 are illustrated in the embodiment, but not limited thereto. In another embodiment (not shown), when the projector includes more than two circuit boards (e.g. 410, 420, 430), the plurality of circuit boards 410, 420, 430 can be stacked on each other according to the temperature or power, wherein the circuit board closer to the bottom plate has the lower temperature or power. For example, the main circuit board 410 having the lowest temperature or power is disposed closest to the bottom plate; the driving circuit board 430 having the medium temperature or power is stacked on the main circuit board 410; the power supply circuit board 420 having the highest temperature or power is stacked on the driving circuit board 430. To dispose the circuit board of higher temperature or power at the higher level and the circuit board of lower temperature or power at the lower level will prevent the circuit board of lower temperature or power from being heated by the circuit board of higher temperature or power. As such, the electronic units of low thermal sensitivity can be operated at a temperature that is more normal, and optimal configuration of convection can be achieved.

Figure 6:
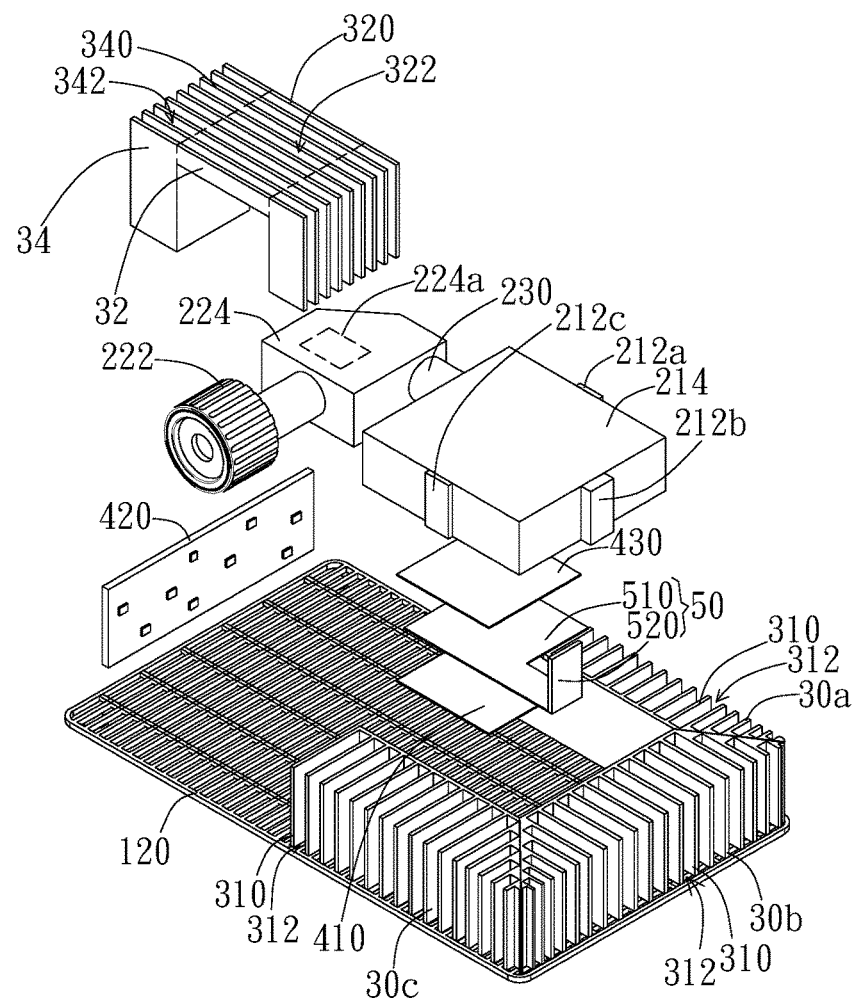
FIG. 6 is a schematic view of the projector according to another embodiment, wherein the top plate and the lateral plates are not illustrated.

Furthermore, as shown in FIG. 6, in another embodiment, the circuit boards of the projector are not only stacked according to the temperature or power but also separately distributed to improve the thermal influence. In this embodiment, the circuit board 420 that has the highest temperature or power is preferably disposed on one side of the image-forming unit 224, while the circuit boards 410 and 430 that have relatively lower temperature or power are disposed under the light source module 210 according to the temperature or power. Referring to the descriptions related to the embodiments of FIGS. 4A and 5A, the power supply circuit board 420 has the highest temperature or power; the driving circuit board 430 has the medium temperature or power; the main circuit board 410 has the lowest temperature or power. Accordingly, in this embodiment, the power supply circuit board 420 is disposed on one side of the mage-forming unit 224 away from the light source module 210 and isolated from the image-forming module 220 by the extending heat sink 34. The main circuit board 410 is disposed under the light-mixing unit 214 and closer to the bottom plate 120, and the driving circuit board 430 is disposed between the main circuit board 420 and the light-mixing unit 214.

Figure 7A:
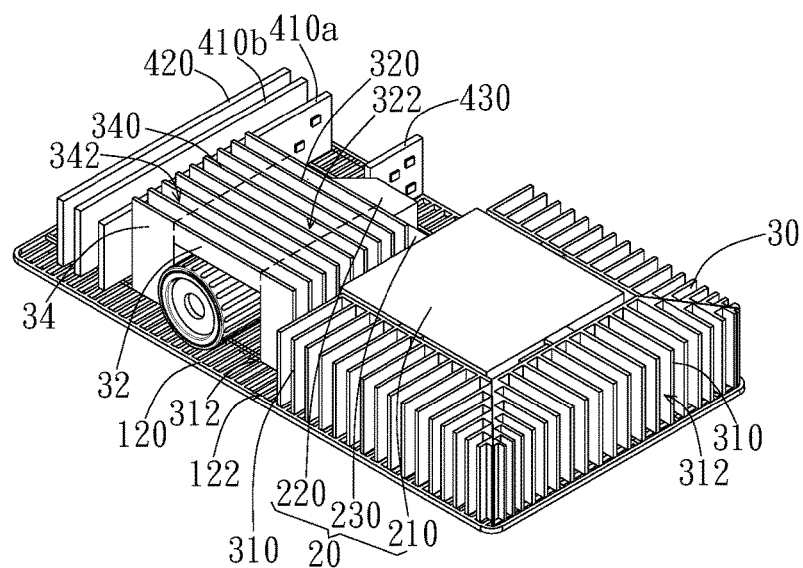
FIG. 7A is a schematic view of the projector according to another embodiment, wherein the top plate and the lateral plates are not illustrated.
Figure 7B:
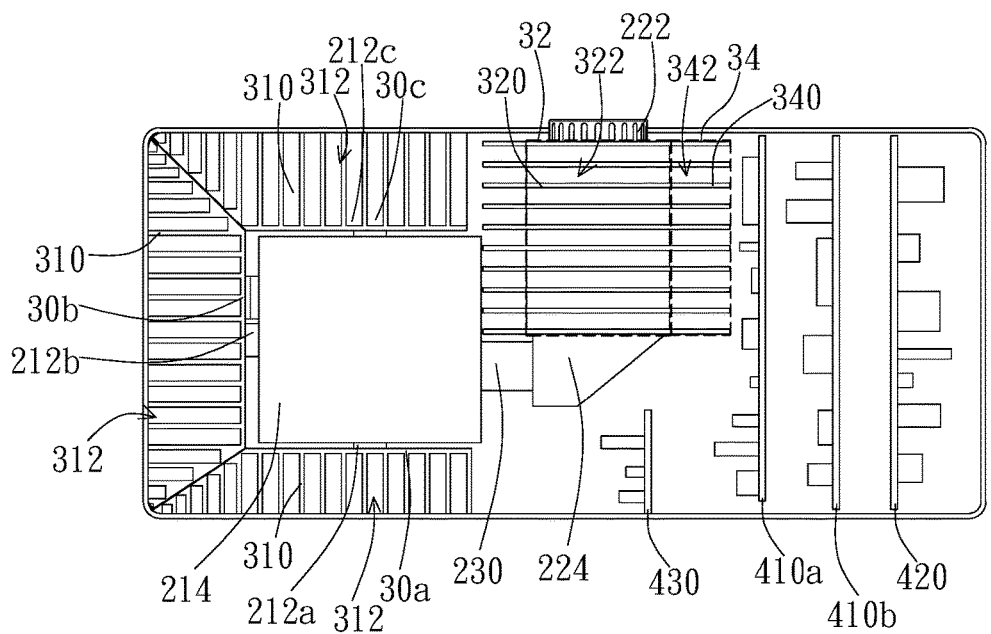
FIG. 7B is a schematic view showing the arrangement of the projector of FIG. 7A.

In another embodiment, as shown in FIGS. 7A and 7B, a plurality of circuit boards (e.g. 410a, 410b, 420, 430) are disposed on one side of the optical engine 20, wherein the plurality of circuit boards 410a, 410b, 420, 430 are disposed upright with respect to the bottom plate 120, so that at least one of the top holes 112 is aligned and communicates with a least one of the bottom holes 122 through space adjacent to the circuit boards 410a, 410b, 420, 430 straightly. Particularly, the plurality of circuit boards 410a, 410b, 420, 430 are disposed on one side of the image-forming module 220 and away from the light source module 210. Moreover, in this embodiment, the input/output (I/O) unit and the control unit of the main circuit board are formed as two separate circuit boards, i.e. the main control circuit board 410a and the I/O circuit board 410b. In this embodiment, the driving circuit board 430 is preferably disposed on the opposite side of the image-forming unit 224 with respect to the lens unit 222, while the main control circuit board 410a, the I/O circuit board 410b, the power supply circuit board 420 are preferably disposed space apart on another side of the image-forming unit 224 with respect to the light source module 210.

It is noted that FIGS. 7A and 7B illustrate the circuit board 430 is disposed to extend perpendicularly away from the image-forming unit 224, but not limited thereto. In other embodiments, the circuit board 430 can be disposed to extend parallel to the side of the image-forming unit 224. Moreover, when the plurality of circuit boards 410a, 410b, 420, 430 are parallelly disposed upright, the circuit board having higher temperature or power (e.g. the power supply circuit board 420) is preferably disposed the outmost or farthest away from the image-forming module 220, and the electronic units thereof preferably face the side holes 132 of the corresponding side plate 130. In this embodiment, the I/O circuit board 410b is disposed between the main control circuit board 410a and the power supply circuit board 420; the I/O circuit board 410b and the power supply circuit board 420 are disposed to have their electronic units facing away from each other. The main control circuit board 410a is disposed in a manner that the electronic units thereof extend toward the fins 340 of the extending heat sink 34. In this embodiment, the normal to the surfaces of the circuit board 410a, 410b, 420, 430 is perpendicular to the normal to the surfaces of the top plate 110 and the bottom plate 120. As such, air channels similar to those between the fins 310 can be formed between the circuit boards 410a, 410b, 420 or adjacent to the circuit board 430. In this embodiment, the top holes 112 of the top plate 110 and the bottom holes 122 of the bottom plate 120 are also disposed corresponding to the circuit boards 410a, 410b, 420, 430, so that the top holes 112 are aligned and communicate with the bottom holes 122 through the space adjacent to the circuit boards 410a, 410b, 420, 430 straightly to form flow paths for normal convection.

Compared to the prior arts, the projector of the invention has the casing with the arrangement of the top holes communicating with the bottom holes and the upright disposition of the heat sinks to achieve high efficient natural convection, so that the rotation speed of the fan can be greatly reduced or even the use of the fan can be eliminated, and in turn the noise generated when the fan is running can be reduced. Moreover, the projector of the invention optimizes the arrangement of the circuit boards and has the metal conductor to greatly reduce the thermal influence to promote the device performance.

Although the preferred embodiments of present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. A projector, comprising:
   a casing having a top plate and a bottom plate, the top plate having a plurality of top holes, the bottom plate having a plurality of bottom holes;
   an optical engine disposed in the casing and between the top plate and the bottom plate, the optical engine comprising a light source module, an image-forming module, and a light pipe connected between the light source module and the image-forming module;
   a plurality of heat sinks disposed around the optical engine, each heat sink having a plurality of fins and a plurality of air channels formed between the fins of the plurality of heat sinks, the plurality of heat sinks including a first heat sink, a second heat sink, and a third heat sink respectively disposed on three sides of the light source module, so that the plurality of fins of the plurality of heat sinks are arranged parallel to each other along the three sides, wherein the top holes are aligned and communicate with the bottom holes through the air channels straightly; and
   an auxiliary heat sink disposed on top of the image-forming module, the auxiliary heat sink having a plurality of fins parallel to each other and extending toward the top plate to form a plurality of auxiliary air channels between the fins of the auxiliary heat sink.

2. The projector of claim 1, wherein the light source module comprises a plurality of light-emitting units attached to the plurality of heat sinks, respectively.

3. The projector of claim 1, further comprising a main circuit board and a power supply circuit board, wherein the light source module is disposed on one side of the image-forming module, the main circuit board is disposed under the light source module, and the power supply circuit board is disposed on another side of the image-forming module.

4. The projector of claim 1, further comprising at least one extending heat sink, wherein the extending heat sink extends from one side of the auxiliary heat sink toward the bottom plate to be located on the side of the image-forming module, the extending heat sink has a plurality of fins disposed parallel to each other and along the side of the image-forming module to form a plurality of extending air channels between the fins of the extending heat sinks, and at least one of the top holes is aligned and communicates with at least one of the bottom holes through the extending air channels straightly.

5. The projector of claim 3, wherein with respect to the bottom plate, the power supply circuit board is disposed upright, and the main circuit board is disposed horizontally.

6. The projector of claim 3, further comprising a driving circuit board, wherein the driving circuit board is disposed between the light source module and the main circuit board.

7. The projector of claim 6, further comprising a metal conductor, wherein the metal conductor comprises a body and an extension part, the body is located between the driving circuit board and the main circuit board to substantially isolate the driving circuit board and the main circuit board, and the extension part bends from the body and extends to overlap at least one of the first heat sink, the second heat sink, and the third heat sink.

8. The projector of claim 7, further comprising a thermal conductive material, wherein the thermal conductive material fills at least one of between the driving circuit board and the metal conductor and between the main circuit board and the metal conductor.

9. The projector of claim 1, further comprising a plurality of thermal insulators disposed on an external surface of the top plate.

10. The projector of claim 9, wherein the external surface of the top plate has a plurality of grooves, and the plurality of thermal insulators are partially inserted into the plurality of grooves.

11. The projector of claim 1, further comprising a plurality of circuit boards, wherein the plurality of circuit boards are disposed upright with respect to the bottom plate, so that at least one of the top holes is aligned and communicates with at least one of the bottom holes through space adjacent to the plurality of circuit boards straightly.

12. A projector, comprising:
a casing having a top plate and a bottom plate, the top plate having a plurality of top holes, the bottom plate having a plurality of bottom holes, an external surface of the top plate having a plurality of grooves;
an optical engine disposed in the casing and between the top plate and the bottom plate;
a plurality of heat sinks disposed around the optical engine, each heat sink having a plurality of fins and a plurality of air channels formed between the fins, wherein the top holes are aligned and communicate with the bottom holes through the air channels straightly; and
a plurality of thermal insulators partially inserted into the plurality of grooves.

13. A projector, comprising:
a casing having a top plate and a bottom plate, the top plate having a plurality of top holes, the bottom plate having a plurality of bottom holes;
an optical engine disposed in the casing and between the top plate and the bottom plate;
a plurality of heat sinks disposed around the optical engine, each heat sink having a plurality of fins and a plurality of air channels formed between the fins, wherein the top holes are aligned and communicate with the bottom holes through the air channels straightly; and
a plurality of circuit boards disposed upright with respect to the bottom plate, so that at least one of the top holes is aligned and communicates with at least one of the bottom holes through space adjacent to the plurality of circuit boards straightly.

\* \* \* \* \*